(12) United States Patent
Powers

(10) Patent No.: US 6,439,515 B1
(45) Date of Patent: Aug. 27, 2002

(54) VIDEO CAMERA SUPPORT DEVICE

(76) Inventor: Adam Daniel Powers, 2828 Rowens Ave. #9, Los Angeles, CA (US) 90039-2026

( * ) Notice: Subject to any disclaimer, the term of this patent is extended or adjusted under 35 U.S.C. 154(b) by 25 days.

(21) Appl. No.: 09/684,774

(22) Filed: Oct. 10, 2000

(51) Int. Cl.⁷ ................................................. A47K 1/04
(52) U.S. Cl. .................... 248/129; 248/170; 248/178.1; 248/182.1; 248/188.5
(58) Field of Search .......................... 248/181.1, 180.1, 248/187.1, 186.2, 178.1, 168, 163.1, 170, 181.2, 173, 440, 288.31, 285.1, 129, 182.1, 188; 352/243; 396/421, 428

(56) References Cited

U.S. PATENT DOCUMENTS

| | | | | |
|---|---|---|---|---|
| 1,272,574 A | * | 7/1918 | Thomas .................... | 248/181.1 |
| 1,559,716 A | * | 11/1925 | Lingle et al. ............ | 248/163.1 |
| 4,156,512 A | | 5/1979 | Brown ........................ | 248/586 |
| 4,158,490 A | * | 6/1979 | Gottschalk et al. ......... | 352/243 |
| 4,474,439 A | | 10/1984 | Brown ........................ | 352/243 |
| 4,625,938 A | | 12/1986 | Brown ........................ | 248/550 |
| 4,657,267 A | | 4/1987 | Jaumann et al. ......... | 280/47.11 |
| 4,699,484 A | | 10/1987 | Howell et al. .............. | 352/243 |
| 4,926,561 A | * | 5/1990 | Miller .......................... | 33/293 |
| 5,429,332 A | | 7/1995 | Shikawa ..................... | 248/187 |
| 5,650,821 A | | 7/1997 | Hewlett ....................... | 348/373 |
| 5,749,549 A | * | 5/1998 | Ashjaee ...................... | 248/168 |
| 5,963,749 A | * | 10/1999 | Nicholson ................... | 396/421 |
| 6,293,676 B1 | * | 9/2001 | Holway ...................... | 352/343 |

OTHER PUBLICATIONS

SKF Product Service Guide, pp. 171, 235, Apr. 1992.

\* cited by examiner

*Primary Examiner*—Leslie A. Braun
*Assistant Examiner*—Tan Le
(74) *Attorney, Agent, or Firm*—Goldstein & Lavas, P.C.

(57) ABSTRACT

A camera support for allowing stationary and stabilized mobile use of a video camera, comprising a base which is capable of free-standing upon a horizontal surface, a camera mount, and a vertical support extending between the base and camera mount. A gimbal bearing assembly is located on the vertical support, having an outer sleeve which is biaxially movable with respect to the vertical support, so that the entire camera support can be supported by the user holding the outer sleeve, allowing the user to move while the vertical support remains stabilized in an upright position. The base has a tripartite construction which is adjustable to balance the camera weight and has retractable legs to which dolly wheels may be removably mounted for an additional mode of mobile operation.

7 Claims, 4 Drawing Sheets

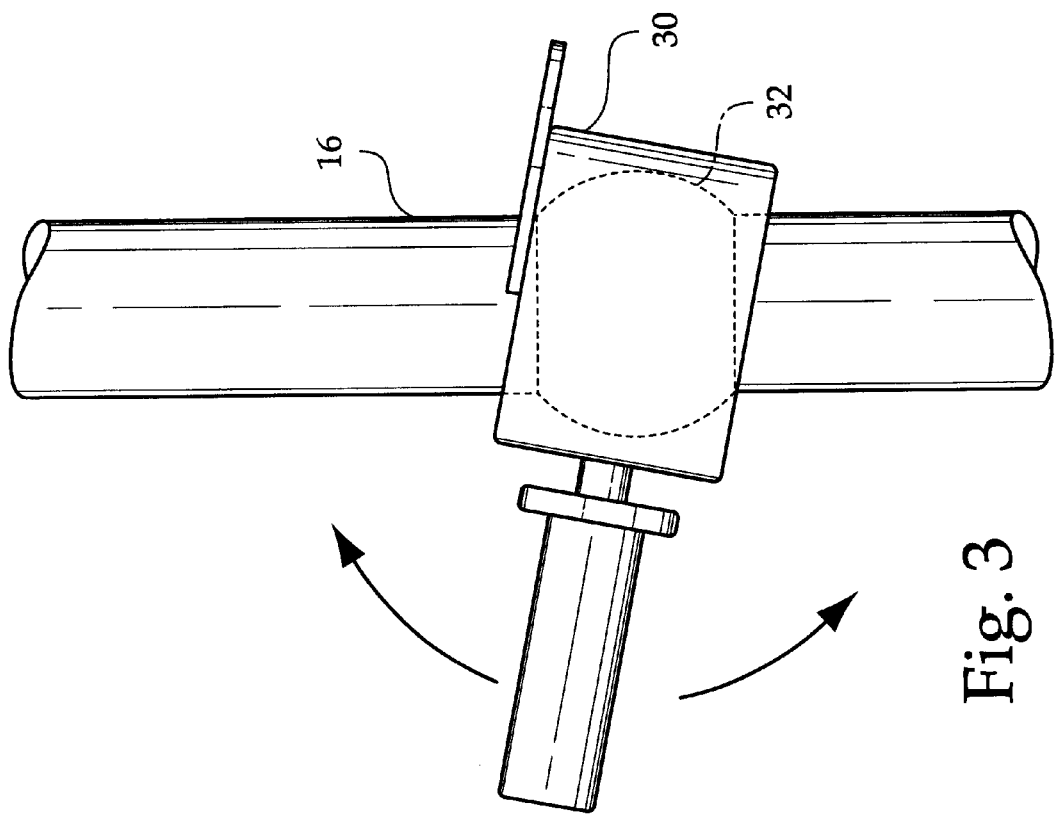
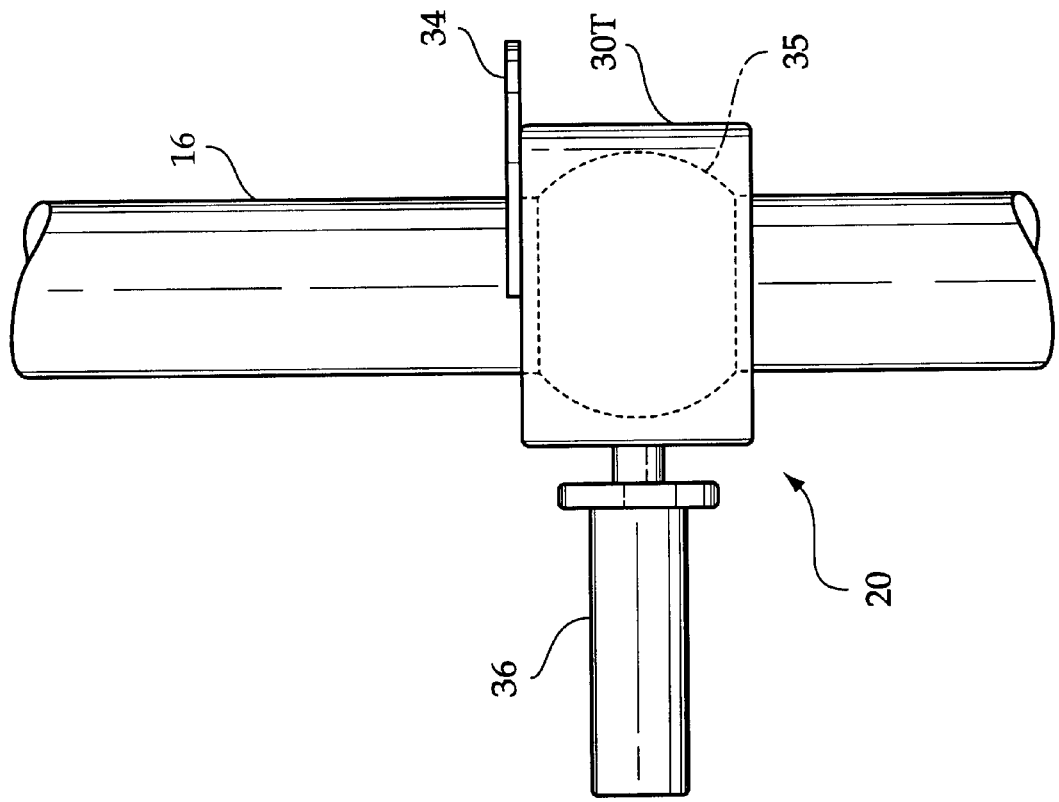

VIDEO CAMERA SUPPORT DEVICE

BACKGROUND OF THE INVENTION

The invention relates to a video camera support device. More particularly, the invention relates to a device which supports a video camera and allows the camera to be operated while stationary as well as while in motion, wherein the camera is stabilized so that motion artifacts are smoothed or eliminated by the device.

A primary goal among both professional and amateur videographers is maintaining a jitter free image. Even when the videographer stands still, the relatively light weight of modern cameras make it easy for shaking and minute hand movements to translate to a jumpy image. But, when the videographer chooses to walk while shooting, the image will often be downright dizzying to the viewer. Only professionals and extremely experienced amateurs can actually walk with the camera and maintain fluid motion and a stabilized image.

One advance in professional videography is the so-called "STEADICAM", stemming from U.S. Pat. Nos. 4,017,168 and 4,156,512 to Brown. The STEADICAM is a large device which helps a camera operator move around the subject while filming with relative ease, while maintaining fluid camera movement. However, while it can effectively maintain fluidity while moving, the STEADICAM does not allow the camera to be held perfectly still. The camera is always "floating". Also, The STEADICAM is quite heavy, yet does not allow the operator to set it down on the ground at any time. In addition, the complexity of the STEADICAM makes it too expensive for amateurs. In addition, the STEADICAM does not allow the camera to be raised above the arm reach of the operator, seriously limiting its use in filming "bird's eye" camera angles.

U.S. Pat. No. 4,474,439 to Brown discloses another camera support design which provides support for the "electronics package", a monitor, a battery, and other auxiliary equipment. This design is too complex and thus too expensive for the amateur videographer. Further, the design is configured specifically for supporting auxiliary equipment. Modern video cameras are generally self-contained, and require that the operator carry little or no additional equipment.

Other camera stabilizing and support devices are disclosed in U.S. Pat. No. 4,657,267 to Jaumann; U.S. Pat. No. 4,699,484 to Howell; U.S. Pat. No. 5,429,332 to Ishikawa; and U.S. Pat. No. 5,650,820 to Hewlett. While these units may be suitable for the particular purpose employed, or for general use, they would not be as suitable for the purposes of the present invention as disclosed hereafter.

SUMMARY OF THE INVENTION

It is an object of the invention to provide a video camera support which allows a video camera to be mounted thereto, and then allows a variety of operation modes, allowing for both stationary and mobile videography. Advantageously, the videographer need not remove the camera from the camera support while using the camera in various modes of operation, and even when the camera is not is use. Accordingly, the camera has a camera mount on its upper end, and has a base at its lower end which allows the camera to be supported in a free-standing position.

It is another object of the invention that the camera support stabilizes motion of the camera, reducing jitter and motion artifacts. Accordingly, the combined structural configuration, weighting, adjustability of the base, and gimbal bearing act to reduce camera shaking, increase fluidity of motion, and thus stabilize the acquired image.

It is another object of the invention that dolly wheels are detachably mountable to the base to provide a further mode of usage. Accordingly, the legs fold forward and rearwardly into parallel positions, and allow dolly wheels to be removably attached at extremities thereof.

The invention is a camera support for allowing stationary and stabilized mobile use of a video camera, comprising a base which is capable of free-standing upon a horizontal surface, a camera mount, and a vertical support extending between the base and camera mount. A gimbal bearing assembly is located on the vertical support, having an outer sleeve which is biaxially movable with respect to the vertical support, so that the entire camera support can be supported by the user holding the outer sleeve, allowing the user to move while the vertical support remains stabilized in an upright position. The base has a tripartite construction which is adjustable to balance the camera weight and has retractable legs to which dolly wheels may be removably mounted for an additional mode of mobile operation.

To the accomplishment of the above and related objects the invention may be embodied in the form illustrated in the accompanying drawings. Attention is called to the fact, however, that the drawings are illustrative only. Variations are contemplated as being part of the invention, limited only

BRIEF DESCRIPTION OF THE DRAWINGS

In the drawings, like elements are depicted by like reference numerals. The drawings are briefly described as follows.

FIG. 2 is a side elevational view, illustrating the gimbal bearing assembly.

FIG. 3 is a side elevational view, illustrating movement of the gimbal bearing assembly.

DETAILED DESCRIPTION OF THE PREFERRED EMBODIMENTS

Figure 1:
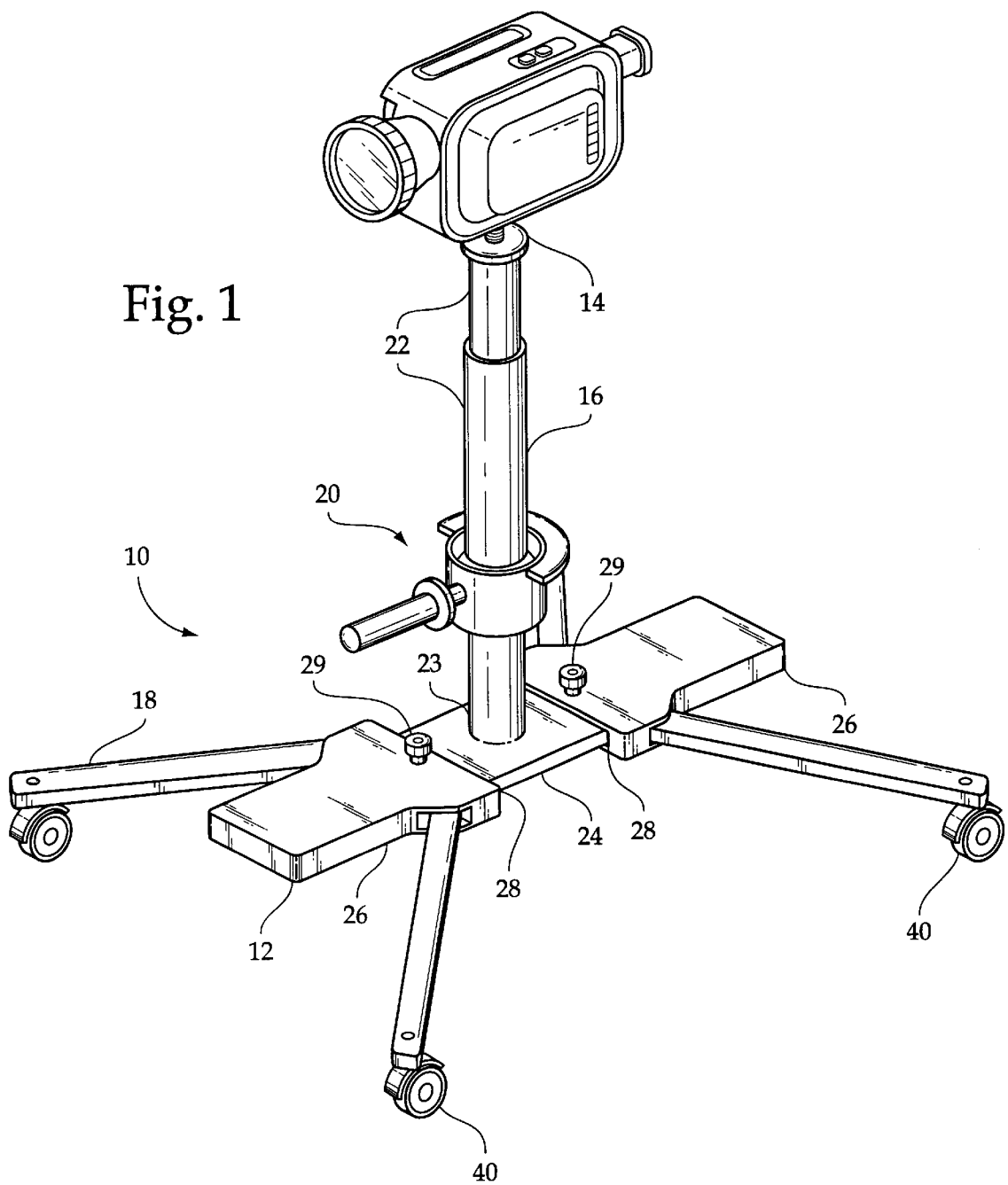
FIG. 1 is a diagrammatic perspective view, illustrating a camera mounted upon the invention, per se.

FIG. 1 illustrates a camera support 10, comprising a base 12, a camera mount 14, and a vertical support 16 extending between the base 12 and camera mount 14. A camera 15 is shown mounted to the camera mount 14. The base 12 has four legs 18 extending outward therefrom. A gimbal bearing assembly 20 is located on the vertical support 16 between the base 12 and camera mount 14.

The vertical support 16 preferably comprises telescoping sections 22 which allow adjustment of the distance between the base 12 and camera mount 14. The telescoping sections 22 are typically a pair of coaxial tubes of slightly different sizes. The telescoping sections 22 may be fixed in a suitable relative position by twisting, set screws, or any other scheme which allows the relative position of such telescoping tubes to be maintained, as is well known by those of skill in the art, and accordingly is beyond the scope of this discussion. Preferably, the telescoping sections 22 extend above the gimbal bearing assembly 20, and the vertical support 16 further comprises a lower support 23 which extends below the gimbal bearing assembly 20 and is a tube that is coaxial with the telescoping sections 22.

The base 12 includes a central plate 24 and a pair of outer plates 26. The outer plates 26 each have a sleeve 28 which allows the central plate 24 to slide therein, such that the outer plates 26 are capable of movement toward and away from each other, effectively lengthening or shortening the base 12. The base includes a pair of plate tighteners 29, each preferably being a tightening screw located on one of the outer plates 26, in communication with the sleeve 28 thereof, so as to tighten against the central plate 24 located within said sleeve 28 and prevent relative movement of the central plate 24 with respect to said outer plate 26. The relative movement of the outer plates 26 in the horizontal plane allow overall weight distribution of the base 12 to be adjusted. Accordingly, components of the base 12 can be customized to act as a counterweight for the camera 15.

Figure 5:
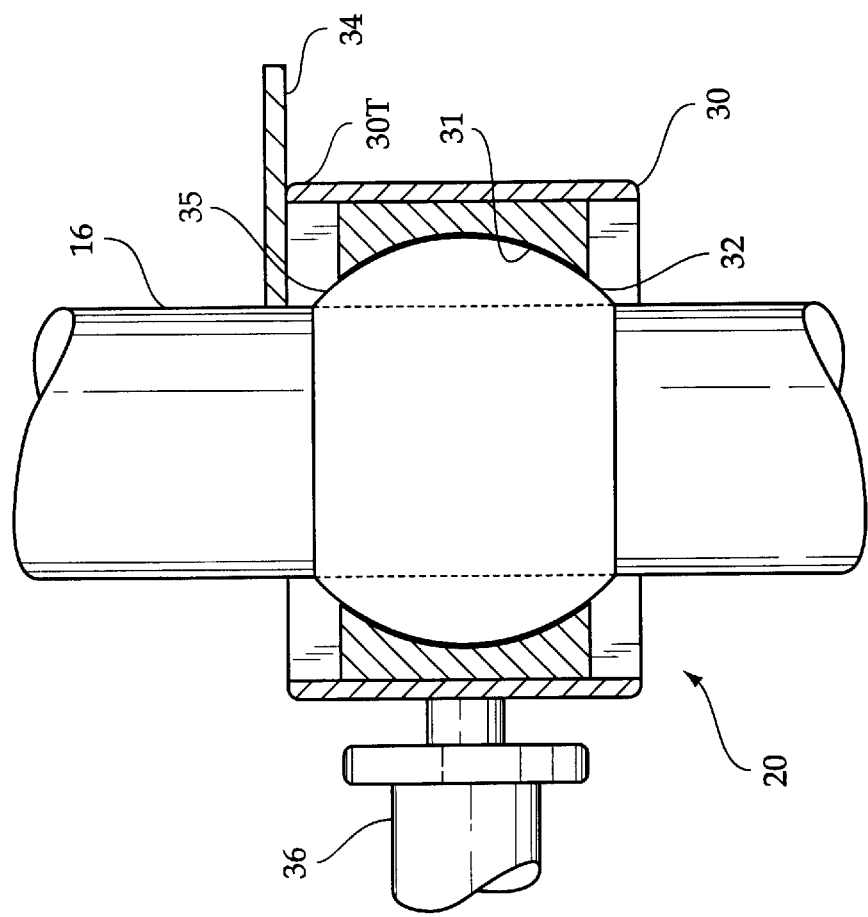
FIG. 5 is a cross sectional view, illustrating the bearing sleeve of the gimbal bearing assembly.

With simultaneous reference to FIG. 1, FIG. 2, and FIG. 5, the gimbal bearing assembly 20 is located on the vertical support 16 between the base 12 and camera mount 14. The gimbal bearing assembly 20 comprises an outer sleeve 30 having an outer sleeve top 30T, an inner sleeve 32, and a handgrip, which may include a flange 34 mounted to the outer sleeve 30 at the outer sleeve top 30T and/or a handle bar 36 extending radially from the outer sleeve 30. The inner sleeve has a semispherical outer surface 35, and an inner sleeve bore, such that the vertical support 16 extends fully through the inner sleeve bore. The outer sleeve 30 has a semispherical inner surface 31 which mates with the semispherical outer surface 35 of the inner sleeve 32 such that the outer sleeve 30 is capable of biaxial movement upon the inner sleeve 32, partially indicated by FIG. 3. In essence, the vertical support 16 is allowed to "float" within the outer sleeve 30 which helps accomplish the image stabilization goals of the invention.

The semispherical inner surface 31 of the outer sleeve 30 and the semispherical outer surface 35 of the outer sleeve 30 comprise what is commonly known as a two piece spherical bearing. A suitable two-piece spherical bearing is manufactured under the tradename SEALMASTER. Among these spherical bearings, the BH-LS Series of heavy duty spherical bearings is preferred.

When the base 12 is properly balanced, the camera support is held by a user by grasping the outer sleeve 30 with one hand. That hand can either hold the outer sleeve 30 directly, resting under the flange 34, or firmly grasp the handle bar 36, according to the embodiment of the invention and/or the preference of the user. The user can then move while holding the camera support 10, and even vary the position of his hand with respect to the horizontal plane. The inherent weight of the base 12 and the vertical support 16 will help "right" the camera support, such that the vertical support and thus the camera will remain in a vertical position despite the hand position and accordingly the position of the outer sleeve 30. In addition, rapid "side-to-side" movements are smoothed, as the inertia of the overall camera support interacts with the gimbal bearing so that the vertical support 16 fluidly lags but follows the hand motion at the outer sleeve 30 and then returns to its upright equilibrium position. In addition, the weight and inertia of the camera support stops jitters which otherwise occur from minute hand movements when holding a lightweight camera. It should also be noted that the handle bar can alternatively or additionally be attached to the vertical support 16 to provide a slight steering of the vertical support while primary support is provided by the user at the outer sleeve 30.

The camera support 10 also works effectively in a stationary mode of operation. Accordingly, the base 12 is substantially flat, and is thus capable of free-standing upon a horizontal surface. Accordingly, the camera support can function effectively as a tripod, wherein the gimbal bearing assembly 20 allows the camera to be tilted as necessary and otherwise remain still. In addition, the camera may remain mounted to the camera support 10 even when the camera is not in use or when it is being transported. Further, many modern digital cameras provide for connectivity to personal computers. In accordance therewith, the camera can easily sit alongside a computer desk, held at desk height by the camera support, while images from the camera are downloaded to the computer.

Figure 4:
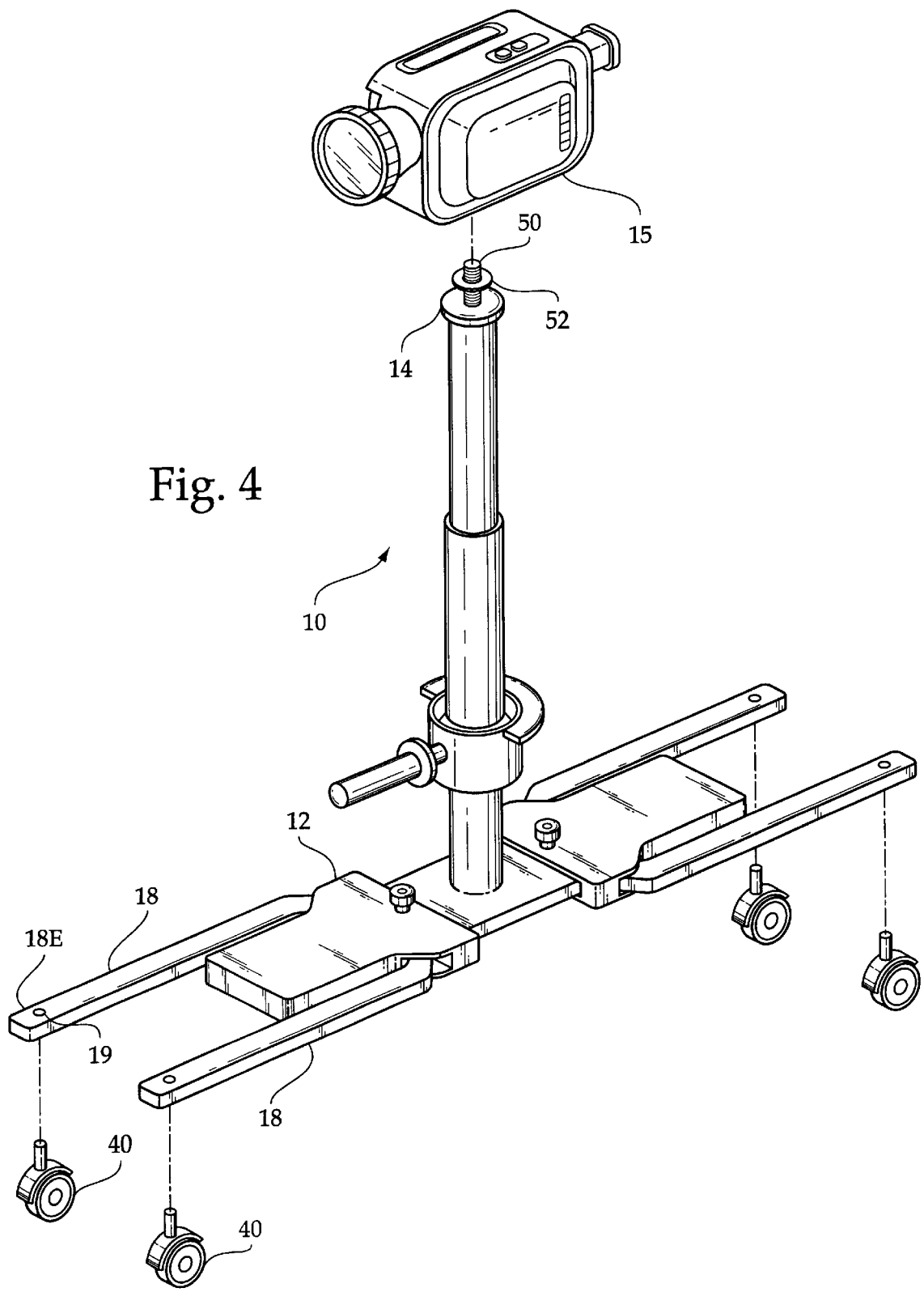
FIG. 4 is a diagrammatic perspective view, illustrating the base in an alternate position, wherein the legs are retractable inward to parallel forward and rearward positions, and wherein dolly wheels are removably mounted in the legs.
Figure 6:
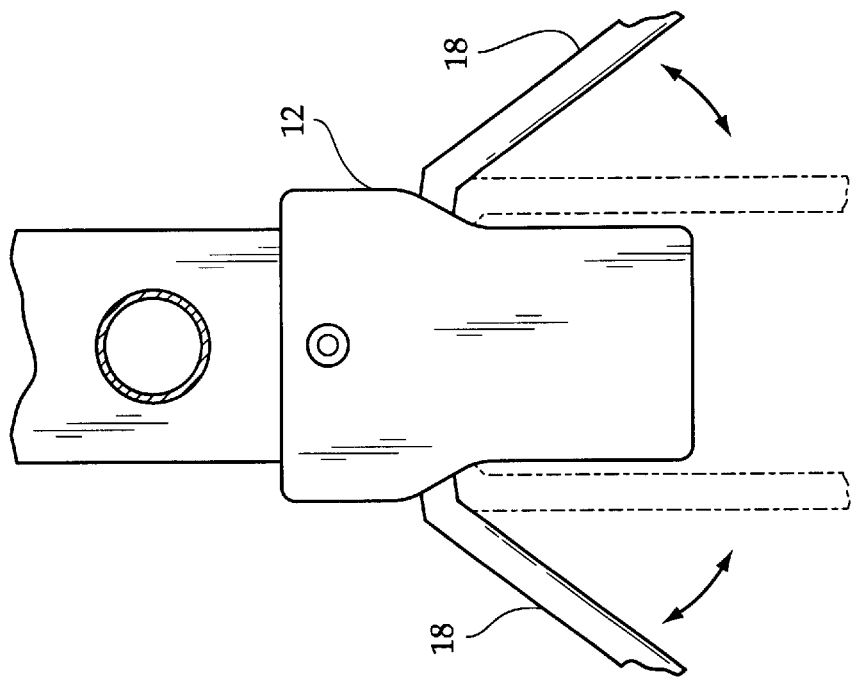
FIG. 6 is a top plan view, illustrating retractability of the legs of the base and relative motion between the extended and retracted positions.

FIG. 4 and FIG. 6 illustrate various modes and positions for the base 12. In particular, the legs 18 are pivotable within the horizontal plane, and are capable of moving between various positions, including an extended position, as shown in FIG. 1 and in full lines in FIG. 6, and a retracted position, as shown in full lines in FIG. 4 and in phantom in FIG. 6. In the retracted position, the legs 18 all extend parallel to each other, such that a pair of the legs extend forwardly of the base 12 of the camera support 10, and a pair of the legs extend rearwardly of the base 12. It should be further noted that in addition to the positions shown, the legs 18 can be configured to extend fully laterally (to the side), such that all legs 18 extend parallel to each other, and all legs are perpendicular to their retracted position shown in FIG. 4.

Also illustrated in FIG. 1 and FIG. 4, dolly wheels 40 are removably mountable to the legs 18. In particular, the legs 18 each have an extremity 18E located on each legs 18 nearly fully opposite from the base 12. A bore 19 may be located at the extremity 18E to facilitate selective mounting and removal of the dolly wheels 40. The dolly wheels 40 thus allow a further mode of mobile operation for the camera support 10. In addition the various positions of the legs 18 allow for various effective widths between the wheels 40. Varying the effective width, and the ability to attach different types of wheels 40 onto the legs also allows the camera support 10 to be used with various track or rail systems often employed in video and motion picture production.

FIG. 4 illustrates the camera mount 14, and the manner of attaching the camera 15 thereto. The camera mount 14 comprises a vertical threaded rod 50, extending coaxially upward from the vertical support 16. A camera mounting nut 52 extends on the vertical threaded rod 50 for tightening up against the camera 15 once the camera 15 is fully threaded onto the vertical threaded rod 50.

In conclusion, herein is presented a camera support for holding a camera during both stationary and mobile filming, such that the camera is effectively stabilized during mobile use thereof. In furtherance of the goals of the invention, said invention has been illustrated by example in the accompanying drawing figures and throughout the written description. It should be appreciated though, that numerous variations are possible, while adhering to the inventive concept. Such variations are contemplated as being a part of the present invention.

What is claimed is:

1. A camera support, for selectively supporting a camera upon a horizontal plane and allowing stabilized movement of said camera, comprising:

a camera mount for allowing a camera to be mounted thereupon;

a base, the base capable of resting on the horizontal plane, the base having a central plate, the vertical support rigidly mounted upon the central plate, a pair of outer plates, the outer plates each having a sleeve such that the central plate is slidably mounted within said sleeves such that the outer plates can be moved toward and away from each other by moving the central plate within the sleeves of said outer plates to alter weight distribution of said base to act as a counterbalance for the camera when mounted in the camera mount;

a vertical support extending between the base and camera mount, the vertical support adjustable in length; and a gimbal bearing assembly, having an outer sleeve and a two piece spherical bearing, the two piece spherical bearing connected between the vertical support and the outer sleeve such that the outer sleeve may be held by the user while the vertical support can move with respect thereto in order to remain substantially vertical.

2. The camera support as recited in claim 1, wherein the vertical support comprises a pair of telescoping sections located above the gimbal bearing assembly for adjusting relative positioning of the camera mount and base, and a fixed lower section located below the gimbal bearing assembly.

3. The camera support as recited in claim 2, wherein the two piece spherical bearing further comprises an inner sleeve having a semispherical outer surface, wherein the outer sleeve comprises a semispherical inner surface, and wherein the semispherical outer surface of the inner sleeve engages the semispherical inner surface of the outer sleeve to allow biaxial relative movement of the outer sleeve upon the inner sleeve.

4. The camera support as recited in claim 3, wherein the base is capable of resting in a free-standing fashion upon a horizontal plane and further comprises four legs, each of the legs pivotally mounted to one of the outer plates, the legs extending outward from the base and parallel to said base, the legs capable of pivoting within the horizontal plane.

5. The camera support as recited in claim 4, wherein the base further comprises a pair of plate tighteners located on the upper surface of the outer plates, the plate tighteners in communication with the sleeve of its associated outer plate for tightening against the central plate and fixing relative positioning of the said outer plate and the central plate.

6. The camera support as recited in claim 5, wherein the legs have an extended position, and a retracted position wherein the legs all extend parallel, wherein two of the legs extend forwardly and the other two legs extend rearwardly.

7. The camera support as recited in claim 6, wherein the legs each have an extremity, located opposite from the base, and wherein wheels are removably mounted at the extremity.

* * * * *